No. 855,970. PATENTED JUNE 4, 1907.
W. B. PEARSON.
SIDE CURTAIN SUPPORT.
APPLICATION FILED APR. 2, 1906. RENEWED APR. 11, 1907.
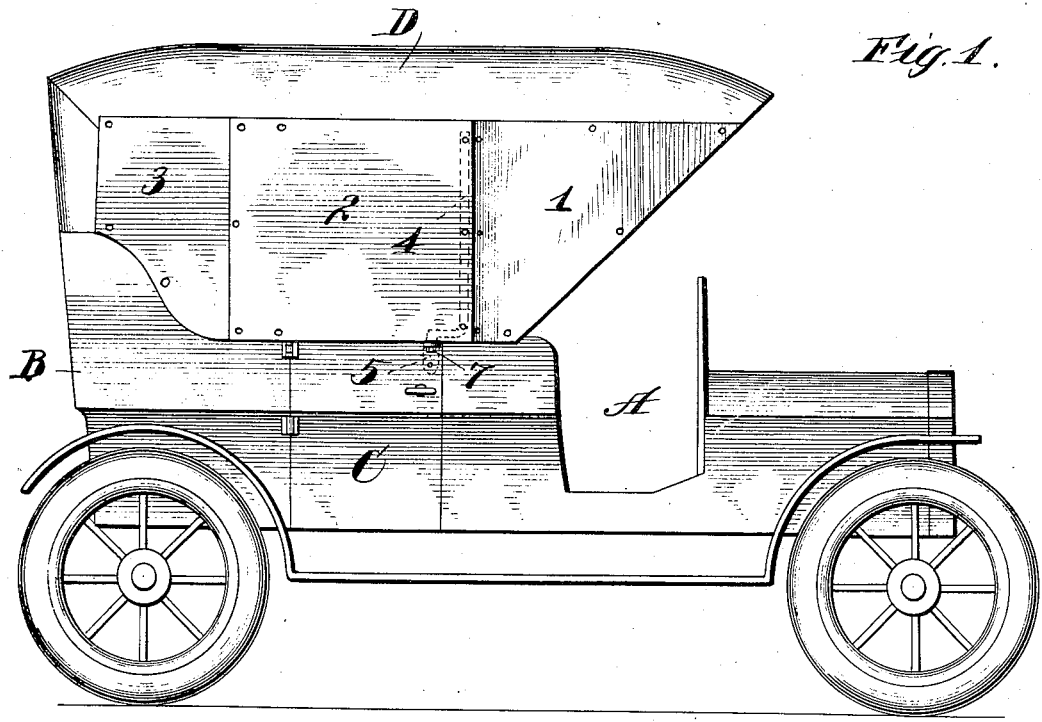
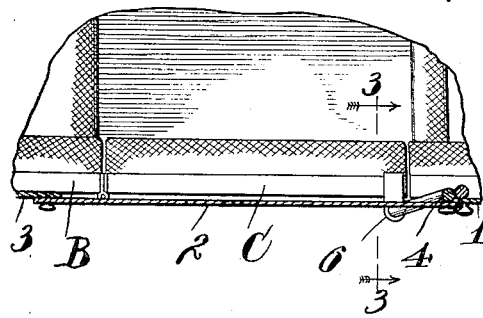
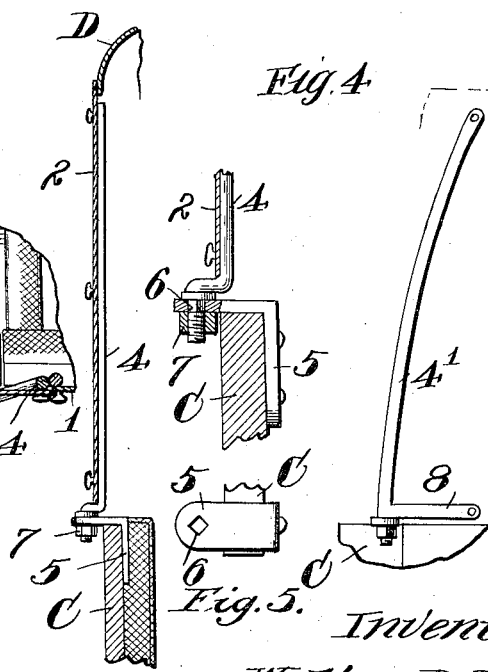
Witnesses:
G. A. Naubenschmidt
Charles B. Gillson.
Inventor:
Walter B. Pearson,
By Geo. E. Waldo,
Atty.

UNITED STATES PATENT OFFICE.

WALTER B. PEARSON, OF DETROIT, MICHIGAN.

SIDE-CURTAIN SUPPORT.

No. 855,970.          Specification of Letters Patent.          Patented June 4, 1907.

Application filed April 2, 1906. Renewed April 11, 1907. Serial No. 367,590.

*To all whom it may concern:*

Be it known that I, WALTER B. PEARSON, a citizen of the United States, and a resident of Detroit, in the county of Wayne and State of Michigan, have invented certain new and useful Improvements in Side-Curtain Supports, of which the following is a specification.

This invention relates to canopies for vehicles, and relates particularly to side curtains therefor.

So far as I am aware, it is the universal practice, at the present time, to secure side curtains in position to inclose a canopy by attaching them to fixed members of the frame of the canopy, thus rendering it necessary that the section of the side curtain covering an entrance to the tonneau be unfastened each time a person desires to enter or leave said tonneau. This arrangement is very inconvenient and this inconvenience is increased by the fact that the means for fastening the side curtains are usually so disposed that they are accessible for attachment and detachment from the outside only, necessitating that said side curtains be fastened and unfastened by a person on the outside, this duty usually devolving upon a person riding upon the front seat of the vehicle, who is thereby subjected to the inconvenience and annoyance of leaving his seat each time it is desired to open or close the door of the tonneau.

The primary object of the invention is to provide side curtains for the canopies of automobiles and other vehicles, the bodies of which comprise tonneaus which are provided with an entrance or entrances and a door or doors for closing the same, said side curtains comprising sections so supported that they form, in effect, upward extensions of said doors which will open and close therewith, to provide for conveniently opening and closing the entrance to the tonneau when the side curtains are in position, thus entirely eliminating the objectionable feature above described.

My invention consists of the various features, combinations of features and details of construction hereinafter described and claimed.

In the accompanying drawings, in which my invention is fully illustrated, Figure 1 is a side view of an automobile the body of which comprises a tonneau having side entrances and equipped with a canopy top, the side curtains of which are shown in position. Fig. 2 is an enlarged top plan view of a door of the tonneau and of the means for supporting the door section of the side curtain. Fig. 3 is a sectional elevation on the line 3—3 of Fig. 2. Figs. 4 and 5 are enlarged detail views; and Fig. 6 is a side view of a modified form of side curtain support adopted for effecting the object of the invention.

Referring now to the drawings, A designates, as a whole, the body of an automobile comprising a tonneau B provided with side entrances adapted to be closed by doors C, said automobile being provided with a canopy designated, as a whole, by D. The openings between the body A of the vehicle and the canopy D are adapted to be closed by removable side curtains comprising front sections 1, intermediate sections 2 and rear sections 3.

As regards their usual features, all of the foregoing members are old and well known in the art and may be of any desired or approved construction.

My invention resides particularly in the means for supporting the intermediate sections 2 of the side curtains whereby they may be opened with and practically as a part of the doors C which close the entrances to the tonneau and which I will now describe.

Secured to each of the tonneau doors C is an upright rod or standard 4, the shape and position of which is such that, when the door is closed said rod or standard will extend substantially parallel with and closely adjacent to the rear side of the canopy support to which the rear edge of a front section 1 of the side curtain is attached, the relation being preferably such that, when adjusted and in closed position the front edge of the intermediate section 2 will overlap the rear edge of the front section 1.

The rear edge of each intermediate section 2 of the side curtain is buttoned or otherwise secured to the canopy support to which the front edge of the rear section 3 of the side curtain is fastened in the usual manner. At its upper edge, said intermediate section 2 of the side curtain may be buttoned or otherwise attached to the lower member of the canopy frame in the rear of the line of the hinge of the door C. In front of the line of the hinge of said door, the upper edge of said section 2 is supported by the rod or standard 4. At its lower edge, said section 2 may be attached to the upper edge of the body A and door C, the buttons or other fastening means being located on opposite sides of the line of the hinge C. With this construction it is obvious that the section 2 of the side curtain, in front of the hinge of the door, will be free to swing or turn with the door, thus providing for opening and closing the entrance to the tonneau by merely opening and closing the door C.

In order that the rods or standards 4 may not disfigure the appearance of the vehicle when the side curtains are not in position. I prefer to secure said rods or standards to the doors so that they may be readily attached when wanted for use and detached and removed when not wanted for use. As shown, said rods or standards 4 are secured in position in the following manner:—Secured to the doors C are angle plates or brackets 5 formed in which are suitable holes or openings 6 through which the lower ends of the rods or standards 4 extend, nuts 7 being preferably threaded to the lower ends of said rods or standards, which project through the openings 6 in the angle plates or brackets 5, to prevent accidental displacement of said rods or standards. To prevent said rods or standards from turning, the holes or openings 6 and the parts of said rods or standards which engage the same are made square. The angle plates or brackets 5 are preferably secured to the inner sides of the doors so that they can be almost entirely covered and concealed by the upholstery of the vehicle and to provide for conveniently securing the rods or standards 4 in position and removing them, the upper ends of said angle plates or brackets in which the openings 6 are formed project laterally beyond the outer sides of the doors.

It is obvious that it will be necessary to variously modify the shape of the lower ends of the rods or standards 4 in order to bring the upright portions thereof in proper relation to the canopy supports to which the rear edges of the front sections 1 of the side curtains are attached, depending upon the shape of the vehicle body and the position of said canopy supports. Neither is it essential that said rods or standards 4 extend in the exact relation to said canopy supports shown, to illustrate which I have, in Fig. 6 of the drawings, illustrated a modified form of rod or standard. In this modification the rod, which is designated as $4^1$, extends upward directly from its point of attachment to the door C to a point in the rear of and closely adjacent to the canopy support to which the rear edge of the front section 1 of the side curtain is secured. The forward extension of said rod or standard $4^1$ to bring its upper end into proper position may be produced, either by extending the same upwardly at an angle, or it may extend parallel with the canopy support and be extended at right angles at its upper end. Preferably, also, this form of rod or standard $4^1$ will comprise an arm 8 adjacent to its lower end which extends frontward therefrom to a position in the rear of the canopy support to which the rear edge of the front side curtain section is attached, corresponding to the position of the upper end of said rod or standard, thus providing desired supports for the front edges of the intermediate sections of the side curtain.

I claim:—

1. The combination with a vehicle body comprising an inclosed portion provided with a suitable entrance, a door for said entrance, a canopy for said vehicle body and side curtains comprising a door section secured to a canopy or other support at one edge beyond the line of the door hinge and a support for the opposite edge of said door section consisting of a rod or standard secured to said door so as to be movable therewith.

2. The combination with a vehicle body comprising an inclosed portion provided with a suitable entrance, a door for said entrance, a canopy for said vehicle body and curtains comprising a door section secured to a canopy or other support at one edge beyond the line of the door hinge and a support for the opposite edge of said door section consisting of a rod or standard detachably secured to said door so as to be movable therewith and removable therefrom.

3. The combination with a vehicle body comprising an inclosed portion provided with a suitable entrance, a door for said entrance, a canopy for said vehicle body and side curtains comprising a door section secured to a canopy or other support at one edge beyond the line of the door hinge and a support for the opposite edge of said door section consisting of a rod or standard secured to said door so as to be movable therewith, said rod or standard being off-set at its lower end to bring the same in desired relative position.

4. The combination with a vehicle body comprising an inclosed portion provided with a suitable entrance, a door for said entrance, a canopy for said vehicle body and side curtains comprising a door section secured to a canopy or other support at one edge beyond the line of the door hinge and a support for the opposite edge of said door section consisting of a rod or standard, a plate secured to said door and which projects beyond the outer side of said door, said plate being provided with a hole or opening to receive the lower end of said rod or standard and means for removably securing said rod or standard against rotation in said hole or opening.

5. The combination with a vehicle body comprising an inclosed portion provided with a suitable entrance, a door for said entrance, a canopy for said vehicle body and side curtains comprising a door section secured to a canopy or other support at one edge beyond the line of the door hinge and a support for the opposite edge of said door section consisting of a rod or standard, an angle plate or bracket, one side of which is secured to the inner side of the door and the other side of which projects outwardly over and beyond the upper edge of the door, said outwardly projecting side of said angle plate or bracket being provided with a hole or opening to receive the lower end of said rod or standard and means for removably securing said rod or standard against rotation in said hole or opening.

In testimony, that I claim the foregoing as my invention, I affix my signature in presence of two subscribing witnesses, this 23rd day of March, A. D. 1906.

WALTER B. PEARSON.

Witnesses:
W. E. LONEY,
A. McGILLIS.